US012730740B2

(12) United States Patent
Jha et al.

(10) Patent No.: US 12,730,740 B2
(45) Date of Patent: Sep. 8, 2026

(54) AUTOMATIC SCHEDULING OR EXECUTION OF SOFTWARE TESTS UPON STATUS CHANGE OF SOFTWARE ARTIFACT INCREMENT

(71) Applicant: SAP SE, Walldorf (DE)

(72) Inventors: Praveen Kumar Jha, Patna (IN); Prakash Kumar, Bangalore (IN); Ravikanth Malipeddu, Bangalore (IN); Prabhat Kumar Singh, Ranchi (IN); Sushanth B R, Bengaluru (IN); Anal Jyoti Goswami, Jorhat (IN); Dev Mithran J, Coimbatore (IN); Maruthi Srinivas Singamsetty, Vijayawada (IN); Mohammed Asif Akbar Basha, Salem (IN); Anand Gupta, Bhopal (IN)

(73) Assignee: SAP SE, Walldorf (DE)

( * ) Notice: Subject to any disclaimer, the term of this patent is extended or adjusted under 35 U.S.C. 154(b) by 291 days.

(21) Appl. No.: 18/415,110

(22) Filed: Jan. 17, 2024

(65) Prior Publication Data

US 2025/0231860 A1 Jul. 17, 2025

(51) Int. Cl.
*G06F 11/3668* (2025.01)

(52) U.S. Cl.
CPC ................................ *G06F 11/3688* (2013.01)

(58) Field of Classification Search
None
See application file for complete search history.

(56) References Cited

U.S. PATENT DOCUMENTS 9,767,000 B1 * 9/2017 Chida ................. G06F 11/3698
10,922,217 B1 * 2/2021 Levi .................... G06F 11/3684
11,281,570 B2 * 3/2022 Zhou ..................... G06F 11/368
2019/0294531 A1 * 9/2019 Avisror ............... G06F 11/3698
2019/0354467 A1 * 11/2019 Wiener ............... G06F 11/3688
2020/0104246 A1 * 4/2020 Bhatt .................. G06F 11/3692
2020/0125485 A1 * 4/2020 Wiener ............... G06F 11/3698
2020/0142818 A1 * 5/2020 Holla .................... G06F 11/368
2021/0103514 A1 * 4/2021 Das ..................... G06F 11/3684
2021/0326247 A1 * 10/2021 Mohankumar ..... G06F 11/3676
2022/0091962 A1 * 3/2022 Eberlein ............ G06F 11/3692
2022/0292012 A1 * 9/2022 Amin .................. G06F 11/3692
2024/0256250 A1 * 8/2024 Bokka ........................ G06F 8/65
2025/0225060 A1 * 7/2025 Sahu ................... G06F 11/3684

OTHER PUBLICATIONS

Baresi, "An Introduction to Software Testing", 2005, Elsevier B.V. (Year: 2005).*

* cited by examiner

*Primary Examiner* — Hossain M Morshed

(74) *Attorney, Agent, or Firm* — Klarquist Sparkman, LLP

(57) ABSTRACT

The present disclosure provides techniques and solutions for automating the scheduling or execution of software tests defined for an increment to one or more software artifacts as the increment undergoes status changes during a development or release process. For example, tests can be executed or scheduled when an increment changes from a development landscape to a qualification landscape. A timeline scenario is defined that includes one or more timelines. The timelines include information useable to identify an increment and its associated tests, as well as configuration information for an entity where the tests will be executed. The increment is monitored, and tests specified in an appropriate timeline are executed or scheduled for execution when the timeline's associated status change is detected.

20 Claims, 11 Drawing Sheets

AUTOMATIC SCHEDULING OR EXECUTION OF SOFTWARE TESTS UPON STATUS CHANGE OF SOFTWARE ARTIFACT INCREMENT

FIELD

The present disclosure generally relates to software testing.

BACKGROUND

Software programs can be exceedingly complex. In particular, enterprise level software applications can provide a wide range of functionality, and can process huge amounts of data, including in different formats. Functionality of different software applications can be considered to be organized into different software modules. Different software modules may interact, and a given software module may have a variety of features that interact, including with features of other software modules. A collection of software modules can form a package, and a software program can be formed from one or more packages.

Given the scope of code associated with a software application, including in modules or packages, software testing can be highly important and highly complex, given that it can include user interface features and "backend" features and interactions therebetween, interactions with various data sources, and interactions between particular software modules. It is not uncommon for software that implements tests to require substantially more code than the software that is tested.

While testing is important for new software applications, it remains important as software applications are updated, and as they are be maintained. In fact, since it may be more common for applications to be updated or to need maintenance, the volume of tests performed as part of update and maintenance can be greater than testing for "new" software applications.

Software development, including for software updates, often goes through several stages. For example, developers may initially develop updates in a development landscape. After a given software update has progressed in development, it can be transitioned to a qualification landscape, which can more closely resemble a "production" system where the software update will be used. The software update can then be released to the production system. A maintenance landscape can be associated with the production system, and so testing can continue even once the software update is being used by customers.

It can be difficult for developers to track what tests need to be performed for software updates at various points in the development lifecycle, particularly given that release cycles are becoming shorter and because of the complexity and size of some software applications, such as enterprise software applications. If a developer fails to perform certain tests, software updates may be released that cause problems once used by customers. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure provides techniques and solutions for automating the scheduling or execution of software tests defined for an increment to one or more software artifacts as the increment undergoes status changes during a development or release process. For example, tests can be executed or scheduled when an increment changes from a development landscape to a qualification landscape. A timeline scenario is defined that includes one or more timelines. The timelines include information useable to identify an increment and its associated tests, as well as configuration information for an entity where the tests will be executed. The increment is monitored, and tests specified in an appropriate timeline are executed or scheduled for execution when the timeline's associated status change is detected.

In one aspect, the present disclosure provides a process of automatically scheduling or executing software tests for a software artifact after a status change of the software artifact. One or more software tests for a software artifact are associated with an identifier of the software artifact. The software artifact implements an update to a software application. A status of the software artifact is monitored. Based on the monitoring, it is determined that a status of the software artifact has changed. Based on the determining that the status of the software artifact has changed, at least a portion of the one or more software tests are automatically executed or scheduled for execution.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
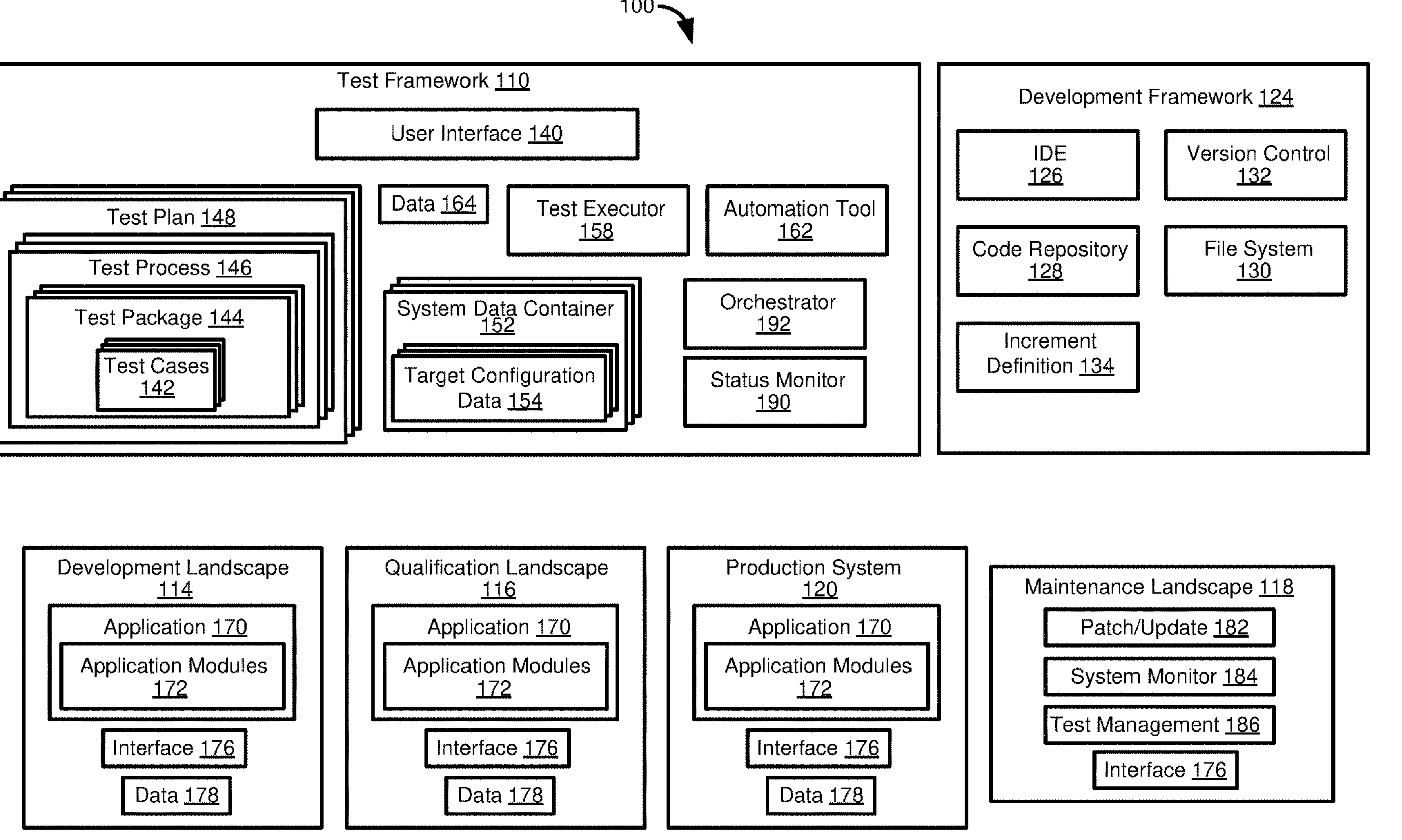
FIG. 1 is a diagram of a deployment ecosystem, also referred to as a deployment landscape, along with a test framework, in which disclosed techniques can be implemented.

Software programs can be exceedingly complex. In particular, enterprise level software applications can provide a wide range of functionality, and can process huge amounts of data, including in different formats. Functionality of different software applications can be considered to be organized into different software modules. Different software modules may interact, and a given software module may have a variety of features that interact, including with features of other software modules. A collection of software modules can form a package, and a software program can be formed from one or more packages.

Given the scope of code associated with a software application, including in modules or packages, software testing can be highly important and highly complex, given that it can include user interface features and "backend" features and interactions therebetween, interactions with various data sources, and interactions between particular software modules. It is not uncommon for software that implements tests to require substantially more code than the software that is tested.

While testing is important for new software applications, it remains important as software applications are updated, and as they are maintained. In fact, since it may be more common for applications to be updated or to need maintenance, the volume of tests performed as part of update and maintenance can be greater than testing for "new" software applications.

Software development, including for software updates, often goes through several stages. For example, developers may initially develop updates in a development landscape. After a given software update has progressed in development, it can be transitioned to a qualification landscape, which can more closely resemble a "production" system where the software update will be used. The software update can then be released to the production system. A maintenance landscape can be associated with the production system, and so testing can continue even once the software update is being used by customers.

It can be difficult for developers to track what tests need to be performed for software updates at various points in the development lifecycle, particularly given that release cycles are becoming shorter and because of the complexity and size of some software applications, such as enterprise software applications. If a developer fails to perform certain tests, software updates may be released that cause problems once used by customers. Accordingly, room for improvement exists.

The present disclosure addresses issues noted above by automatically executing tests or scheduling tests for execution as a software update progresses through the development cycle. The present disclosure generally describes software updates as implemented in the STEP (SAP Test Execution Platform) testing system of SAP SE, of Walldorf, Germany. However, disclosed techniques can be used in any suitable automated testing environment.

Disclosed techniques refer to software updates in the form of increments, where an increment refers to any changes to a software artifact. An increment can be defined to include one or more code or feature changes or additions. That is, existing code, such as implementing a feature can be updated. Or, code can be introduced that adds a new feature. Increments can also include non-code changes, such as changes to configuration information or data objects used by the software artifact. For example, the definition of a class or object, such as a JSON object, used by the software artifact can change. Or, data associated with an instance of such class or object can change.

In a particular implementation, an increment has an identifier and contains links to files, directories, or code branches that include code, data, or development objects that are relevant to the software update. In other cases, the increment can directly identify or include such code, data, or development objects.

The increment represents a software unit that can be transitioned between different landscapes and systems, or can otherwise be associated with status changes associated with a development and release process. As described above, an increment can be moved between development, qualification, and maintenance landscapes, as well as being released to a production system. The increment can be transitioned directly, or a larger update unit that includes multiple increments can be transitioned. So, the larger update can be specified for transition, and then associated increments can be transitioned.

The collection of relevant landscapes and computing systems can be referred to as a deployment ecosystem, or a deployment landscape. The present disclosure provides a deployment ecosystem orchestrator that manages test executions for software increments as they transition between different entities in the deployment ecosystem, or otherwise transition between various development statuses. When an increment transitions between entities, or otherwise changes status, the orchestrator can detect such change and can execute or schedule tests for the increment in that system (or test associates with the new status). The orchestrator can also manage test execution at the entity from which the increment transitioned (or, more generally, tests associated with a prior status). For example, the orchestrator can cancel test execution at that entity, either immediately or upon a trigger, including a time-based trigger (such as a date or the lapse of a particular period of time). In some cases, it can be useful to have testing performed in multiple entities in a deployment ecosystem, or for multiple statuses of an increment, for at least some time period.

By automatically detecting transitions between deployment ecosystem entities and other status changes, tests can be initiated or otherwise managed without direct user involvement (at least at the time of transition). This automatic management of software tests can be beneficial, including because it avoids the need for a user to remember to manually execute or schedule tests when a transition occurs. This is a significant advantage, since software development can include many increments, where each increment can be associated with a very large number of tests that would need to be executed or scheduled upon a transition event. The automated execution and scheduling of tests can make software development more robust, as it can reduce the changes of software bugs being included in later development stages, or in a production environment since it can be ensured that all tests intended for the increment are in fact executed.

Although the disclosure proceeds with a discussion of increments transitioning between entities in a deployment ecosystem, disclosed techniques can be applied to other types of status changes. For example, increments can be associated with different release statuses within a given entity of the deployment ecosystem, and tests can be executed or scheduled for execution when the increment changes release status, even if the increment does not transition to another deployment ecosystem entity.

More specifically, particularly in complex, cloud-based environments like those managed by SAP S/4HANA, deployment milestones are a type of status change or juncture that signify significant progress or completion of particular stages within the software lifecycle. These milestones are markers of progress, and help provide that software transitions smoothly through various stages of development, testing, and deployment. Examples of such milestones include Development Close (DC), Correction Close (CC), and Emergency Correction Close (ECC). During the DC phase, development teams finalize their code, indicating the end of the primary development stage; this typically occurs in the development system, where new features or changes are initially created and tested. The CC phase follows, where the software undergoes rigorous testing in a separate quality assurance or qualification system, and any identified bugs or issues from the DC phase are addressed and rectified. Finally, the ECC phase represents a juncture where urgent fixes or patches are applied, often in response to issues discovered in the production system post-deployment.

Aspects of the present disclosure that involve status changes described as a transition from one landscape or system to another can instead be used with status changes associated with deployment milestones or other statuses, whether the transition to another deployment milestone involves a transition to another system/landscape or not.

Example 2—Example Deployment Ecosystem and Test Framework

FIG. 1 illustrates a computing environment 100 in which disclosed techniques can be implemented. The computing environment 100 includes components that are standard parts of software development processes. For example, the computing environment 100 includes a test framework 110 that can be used to perform actions such as defining and executing tests, and analyzing test results. In a specific example, the test framework 110 can be, or can include, the STEP test framework of SAP SE, of Walldorf, Germany. The test framework 110 can be used to schedule and execute tests on, as well as receive test results from, a development landscape 114, a qualification landscape 116, and maintenance landscape 118. The monitoring landscape 160 can be responsible for executing tests on a production system 120.

The test framework 110 can communicate with a development framework 124. The development framework 124 can include an integrated development environment 126. The integrated development environment 126 allows developers to create or edit code associated with software updates, including increments. The code can be stored in a variety of places, such as a code repository 128 (for example, a GIT repository) or in a file system 130. Code in the code repository 128 or file system 130 can be managed using a version control system 132.

The development framework 124 can be used to create increment definitions 134. An increment definition 134 can be used to specify particular software artifacts associated with the increment, including be referencing a link/path in the code repository 128 or files or directories of the file system 130.

A developer can define tests for an increment within the test framework 110, or execute or schedule such tests, through a user interface 140. Individual tests can be created, grouped, and sequenced at various hierarchical levels. Test cases 142 represent the fundamental units of testing, each designed to verify specific functionalities of software artifacts, such as those comprising an increment or additional software used in conjunction with the increment's software artifacts. The tests can take various forms but typically involve executing software to perform specific actions, often including the provision of particular inputs. For example, in web applications, tests can be defined as scripts that interact with the application's user interface.

These test cases can be aggregated into test packages 144, which organize related test cases for efficient execution and managing interdependencies. Managing interdependencies can include sequencing test cases 142 within a package relative to one another. Test processes 146 further extend this organization by sequencing and scheduling test packages, addressing the logical order and dependencies among them. At the highest level of organization, test plans 148 provide an overarching strategy, outlining the scope, objectives, resources, and timeline for the testing activities. This can include the relative scheduling of test processes 146 within the test plan 148.

A system data container (SDC) 152 can be used to store and manage target configuration data for executing tests in different landscapes, such as the development landscape 114, the qualification landscape 116, and other testing environments. The SDC 152 can store elements such as URL endpoints, cloud resource identifiers, and specific authorization credentials, including API keys or OAuth tokens. These configurations can be used to tailor the test environment to the specific requirements of each landscape.

As more specific examples, the SDC 152 may contain configuration details for the development landscape 114 such as:

- Local Server Details: Details of the development server, such as Server URL: http://devserver.local; Port: 8080.
- Database Connection Strings: Information for connecting to the development database, like Server=devdb.local; Database=DevDB; User Id=dev; Password=devpass.
- Version Control System (VCS) Access: Access credentials for the VCS, such as VCS Server: http://vcs.local; Username: devuser; Access Token: XYZ123.
- Debugging and Logging Settings: Settings to enable detailed logging and debugging, e.g., Logging Level: Verbose; Debug Mode: Enabled.
- Local Authorization Credentials: Specific credentials for accessing local development resources, like API Key: LOCAL1234; User Role: Developer.

The SDC 152 may contain configuration details for the qualification landscape 116 such as:

- Staging Server Details: Information about the staging server, such as Server URL: http://staging.example.com; Port: 8000.
- Test Database Connection Strings: Strings for connecting to the test database, for example, Server=testdb.example.com; Database=TestDB; User Id=tester; Password=test123.
- Performance Monitoring Tools Access: Credentials and settings for performance monitoring tools, like Tool: NewRelic; Access Key: ABCD5678.
- Staging Environment Variables: Variables specific to the staging environment, such as ENV=STAGING; Feature Flag: NewFeature=ON.
- Staging Authorization Credentials: Credentials required for the staging environment, e.g., OAuth Token: STAGE-TOKEN-7890; User Role: Tester.

A test executor 158 coordinates the execution of tests, sometimes using an automation tool 162, such as SELENIUM, POSTMAN or START. In some implementations, execution of test cases 142 uses test data embedded in a test definition, while in other cases the test execution can use data 164 maintained in the test framework 110, or can use data associated with a respective landscape 114-118 or the production system 120.

As discussed, a key benefit of the disclosed technology is the ability of the test framework 110 to track the progress of increments through various landscapes and environments, or through other statuses. In the specific example of the computing environment 100, the development landscape 114 is an initial testing environment for new code and features, providing a dynamic space for isolated or small-scale integrated testing. The qualification landscape 116 can act as a pre-production environment, allow an application, including particular increments, to be validated under conditions that mimic those of the production system 120. The production system 120 is where the application is operational and available to end-users, where the application is expected to be stable and performant.

The development landscape 114, qualification landscape 116, and production system 120 are shown as including an application 170, which is updated via one or more increments (whose functionality is tested using one or more test cases 142 and related constructs). The application 170 can be composed of multiple modules 172 (or, more generally, software artifacts). The development landscape 114, qualification landscape 116, maintenance landscape 118, and production system 120 are shown as including respective interfaces 176, which can be used in communicating with the test framework 110. The development landscape 114, qualification landscape 116, and production system 120 are also shown as including data 178, which can be data used in executing test cases 142.

The maintenance landscape 118 is used for the ongoing upkeep of an application 152 in the production system 120. The maintenance landscape 118 can include patch/update functionality 182 and a system monitor 184 for proactive maintenance, helping ensure the reliability of the application 170. The maintenance landscape 118 also includes a test management component 186, which oversees testing of the production system 120.

The test framework 110 can include a status monitor 190 that monitors a status of an increment. For example, the status monitor 190 can track what landscape or environment an increment is currently associated with. The status monitor 190 can use a polling mechanism to track increment status, or a change in increment status can cause a notification to be sent to the status monitor. In another example, the status monitor 190 stores values that include logical pointers to status information, such as a variable that indicates what deployment ecosystem entity an increment is associated with, or a current development process the increment is associated with, where a given entity in the deployment ecosystem can be used for multiple development processes.

If a status of the increment changes, an orchestrator 192 can be responsible for causing appropriate test cases 142 (including through other test artifacts, such as a test package 144, a test process 146, or a test plan 148) to be executed or scheduled in a landscape or environment to which the increment has transitioned. The orchestrator 192 can also be responsible for descheduling tests, or modifying a test schedule, at a landscape or environment from which the increment transitioned, or is otherwise associated with an increment status change.

Example 3—Example Timeline Configuration

Figure 2:
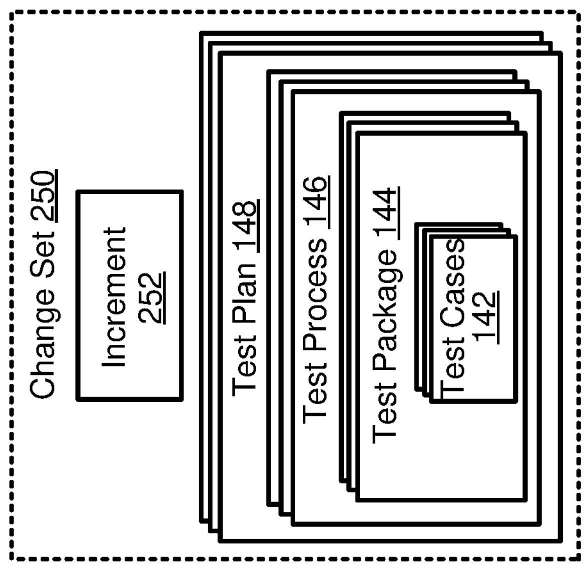
FIG. 2 illustrates components of a timeline and a change set that represents an increment to one or more software artifacts and software tests, and groupings of software tests, associated with the increment.
Figure 2:
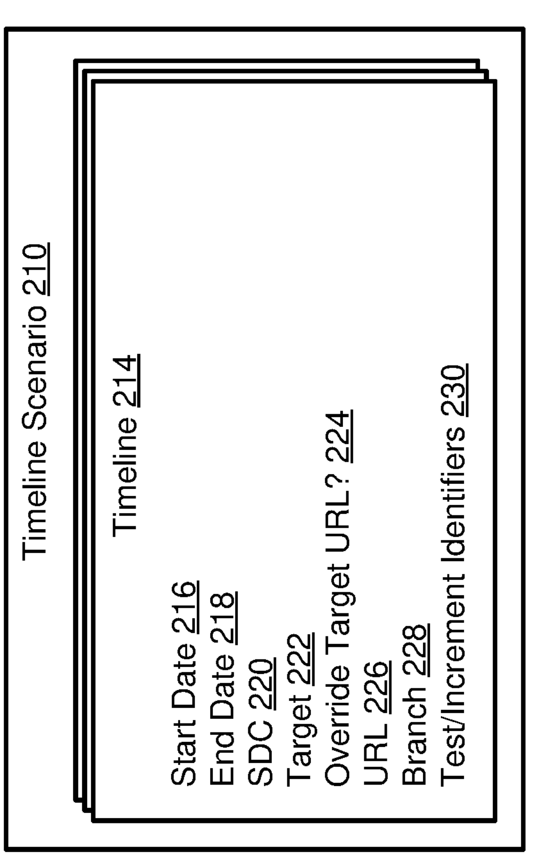
Figure 2:

FIG. 2 illustrates a definition of a timeline scenario 210. The timeline scenario 210 includes one or more timelines 214. The timeline scenario 210, and its associated timelines 214, can be used, such as by the orchestrator 192 of FIG. 1, in monitoring an increment and scheduling or executing software tests when a status change associated with a timeline 214 is detected. The timeline scenario 210 and associated timelines 214 are computer implemented objects. For example, information regarding timelines scenarios 210 and timelines 214 can be maintained in relational database tables or in objects, such as JSON objects. The timeline scenarios 210 and timelines 214 can also be implemented as instances of abstract or composite data types, such as having a class corresponding to a timeline scenario, where the class can specify (such as in a class member variable) instances of a class corresponding to a timeline.

The definition information for a timeline 214 can specify a particular time period during which tests associated with the timeline are to be executed, such as using a start date 216 and an end date 218. That is, tests associated with the timeline 214 will be executed so long as an increment transitions to a landscape specified in the timeline configuration between the start and end dates 216, 218, or, more generally, when a status change occurs during that time period.

In some cases, the end date 218 can be omitted, or both the start date 216 and the end date can be omitted. For example, in some cases, it may be desired to execute particular tests in a landscape as soon as a relevant increment is transitioned to a particular landscape until the increment transitions to a new landscape. Similarly, it may be desired to have tests start on a certain date, after the increment transitions to the relevant landscape, until the increment transitions to another landscape. In yet further implementations, a start date 216 is omitted, but an end date 218 is specified. This configuration can be useful in scenarios where the end date 218 is honored even after the increment transitions to a new landscape. For example, it may be beneficial in some circumstances to continue testing in both a new and old landscape for at least some time period.

The definition of the timeline 214 also specifies a system data container 220 and a particular target 222 of the system data container. That is, the system data container 220 can include configuration information for multiple targets, including multiple targets of the same type, such as having information for multiple development landscapes.

Often, a target, such as the target 222, is associated with a URL, where the URL can be included in the SDC in association with the target. However, this URL can be a default URL, which can be overridden, which can be specified as an override URL 226. For example, overriding a default URL can be useful when it is desired to execute tests against a different instance or variant of the target system, having a distinct URL.

This override is a temporary modification, affecting only the specific test execution, and does not permanently alter the URL in the SDC specified in the SDC identifier 220. This ensures that subsequent test executions revert to using the standard URL unless explicitly overridden again. Typically, only the URL itself is modified for the test execution during an override event. All other configuration information in the SDC, such as client ID, login credentials, and other settings, can remain unchanged and is used during test execution. This approach maintains consistency in the configuration details of the target system while adjusting only the connection endpoint for specific test requirements.

The definition of the timeline 214 can also include a branch identifier 228. In the context of test automation, particularly when overriding a target URL or scheduling tests with target information in an integrated development environment (IDE), a branch can refer to a specific line or version of development within a version control system like Git. Branch-specific testing can allow for tests that are tailored to the unique developments within a particular branch. Overriding the target URL can direct to an environment that hosts the branch's version of the application. In some cases, rather than specifically including the override URL 224, the branch identifier 228 can be used to determine a particular URL that should be used for test execution (that is, the branch identifier can be mapped to the appropriate URL).

Branches also can correlate with different environments in the development process. For instance, a development branch may be linked to a development landscape, while a qualification branch can correspond to a qualification landscape. The relationship between a branch and a landscape can help provide that when tests are scheduled, the target URL is selected to match the environment associated with the branch in focus. Again, for example, rather than directly specifying the override URL 224, the branch identifier 228 can be used to direct test execution to a specific URL that may be different from a default URL included in the target information for the landscape/environment in the SDC.

A definition of a timeline 214 can also include identifiers 230 for particular tests or increments. In a specific example, the definition of the timeline 214 stores one or more increment identifiers. Definitions of various tests or test groupings can identify a particular increment with which they are associated. Thus, when a timeline 214 is used, increment identifiers 230 can be retrieved and tests associated with the increment identifiers located and processed according to the other parameters defined for the timeline configuration.

In other cases, tests can be directly specified using test identifiers 230, where the tests are defined for a specific increment or otherwise associated with a specific increment. For example, a test definition or test grouping can specify an increment for which the tests should be executed. In a specific example, as will be further described, a definition of a timeline 214 can include test identifiers 230 that identify specific test processes, such as the test processes 146 of FIG. 1, and their corresponding increments.

The definition of a timeline 214 can include additional or alternative information. For example, when a status change is something other than a change in an entity of the deployment ecosystem with which the increment is associated, information about that status change can be included in the definition of the timeline 214. For example, when the status change is a development status change that does not result in a change to another entity of the ecosystem, that development status change can be specified in the definition of the timeline 214, including along with the configuration information for the appropriate target. Take a case where a development landscape has development phase 1 and development phase 2. The definition of the timeline 214 can indicate that development phase 2 is the relevant status change, and so tests can be executed or scheduled for execution once the increment transitions from development phase 1 to development phase 2.

Using the testing structure defined in Example 2, a change set 250 can be defined that includes one or more increment identifiers 252 and directly or indirectly specifies one or more test cases 142, test packages 144, test processes 146, or test plans 148 associated with the increment. The increment identifiers 252 can be monitored, such as by the status monitor 190 of FIG. 1. When an increment associated with one of the increment identifiers 252 transitions to a new target, the test cases 142 in the change set 250 can be executed or scheduled for execution.

Example 4—Example User Interfaces for Defining a Timeline Scenario and Associated Timelines FIGS. 3 and 4A-4D provide example user interface screens illustrating a process for associating increment identifiers with task processes, and for associating task processes with timeline configurations.

Figure 3:
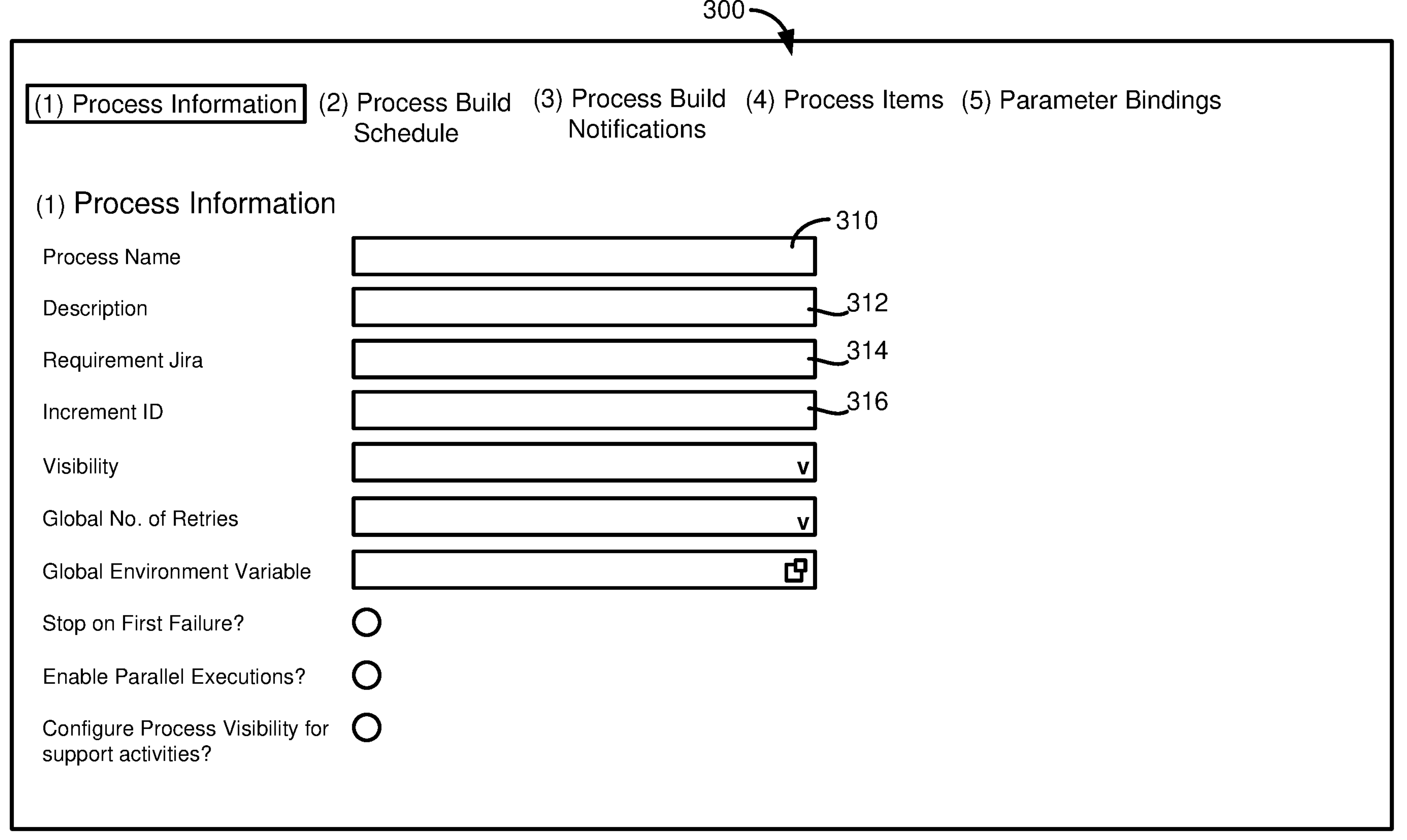
FIG. 3 is an example user interface screen where a user can associate a collection of software tests, in the form of a test process, with an increment to one or more software artifacts.

As discussed in Example 3, in some implementations, an increment can be associated with a definition of a test or test component. FIG. 3 illustrates an example user interface screen 300 that allows a user to define a test process, such as a test process 146 of FIG. 1. The user interface screen 300 provides a number of fields where a user can enter information for the task process, such as a field 310 that assigns a process name, a field 312 that assigns a process description, a field 314 that assigns a Requirement Jira, and a field 316 that assigns an increment ID to the test process.

A Requirement Jira refers to an identifier of a "requirement" that is tracked using issue and requirements tracking software, in particular, JIRA software available from Atlassian Corporation Plc of Sydney, Australia. A "requirement" can express software functionality from the point of view of a user, while increments associated with this requirement can represent particular software changes that implement the functionality associated with the requirement.

The user interface 300 can be a particular user interface in a process of defining a test process. Later user interface screens can allow a user to associated specific test cases with the test process, including scheduling such test cases with respect to one another.

Figure 4A:
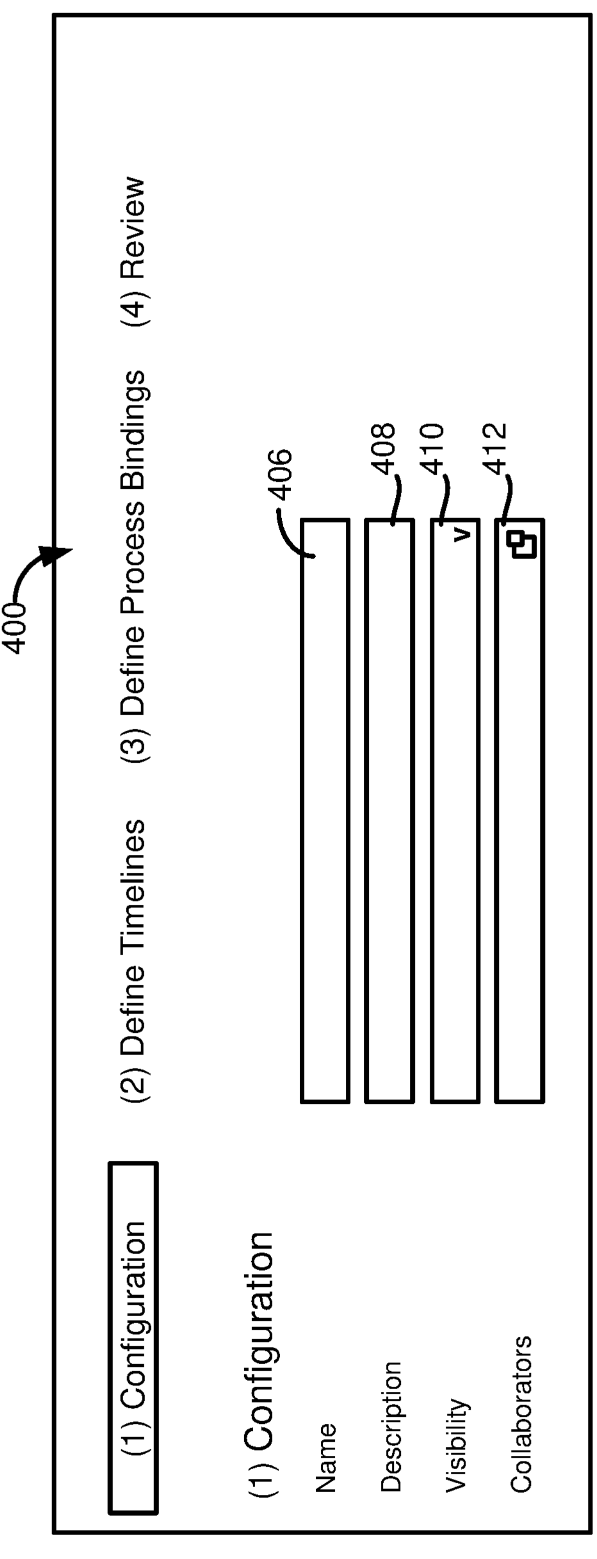
FIG. 4A-4D are example user interface screens allowing a user to define a timeline scenario that includes one or more timelines associated with an increment to one or more software artifacts.

FIGS. 4A-4D illustrate various user interfaces screens in a process, such as a "wizard," for defining a timeline scenario (a set of one or more related timelines). FIG. 4A illustrates a user interface 400 where a user provides basic information for the timeline scenario, such as filling in a name for the timeline scenario in a field 406 and a description of the timeline scenario in a field 408. A visibility of the timeline scenario can be selected using a dropdown control 410, where visibility options can include private, public, and shared, where shared visibility can allow a particular group of users to view, and possibly edit or implement, the timeline scenario, depending on implementation.

Similarly, a list of collaborators can be provided using a user interface control 412, where the collaborators can correspond to users who have shared visibility rights. In other cases, collaborators can represent a group of users who have greater rights with respect to a timeline scenario or particular timeline configurations defined for the timeline scenario. For example, a timeline scenario may be set to have "public" visibility, but only specified collaborators are allowed to edit or delete timeline configurations in the timeline scenario, or to add new timeline configurations to the timeline scenario.

Figure 4B:
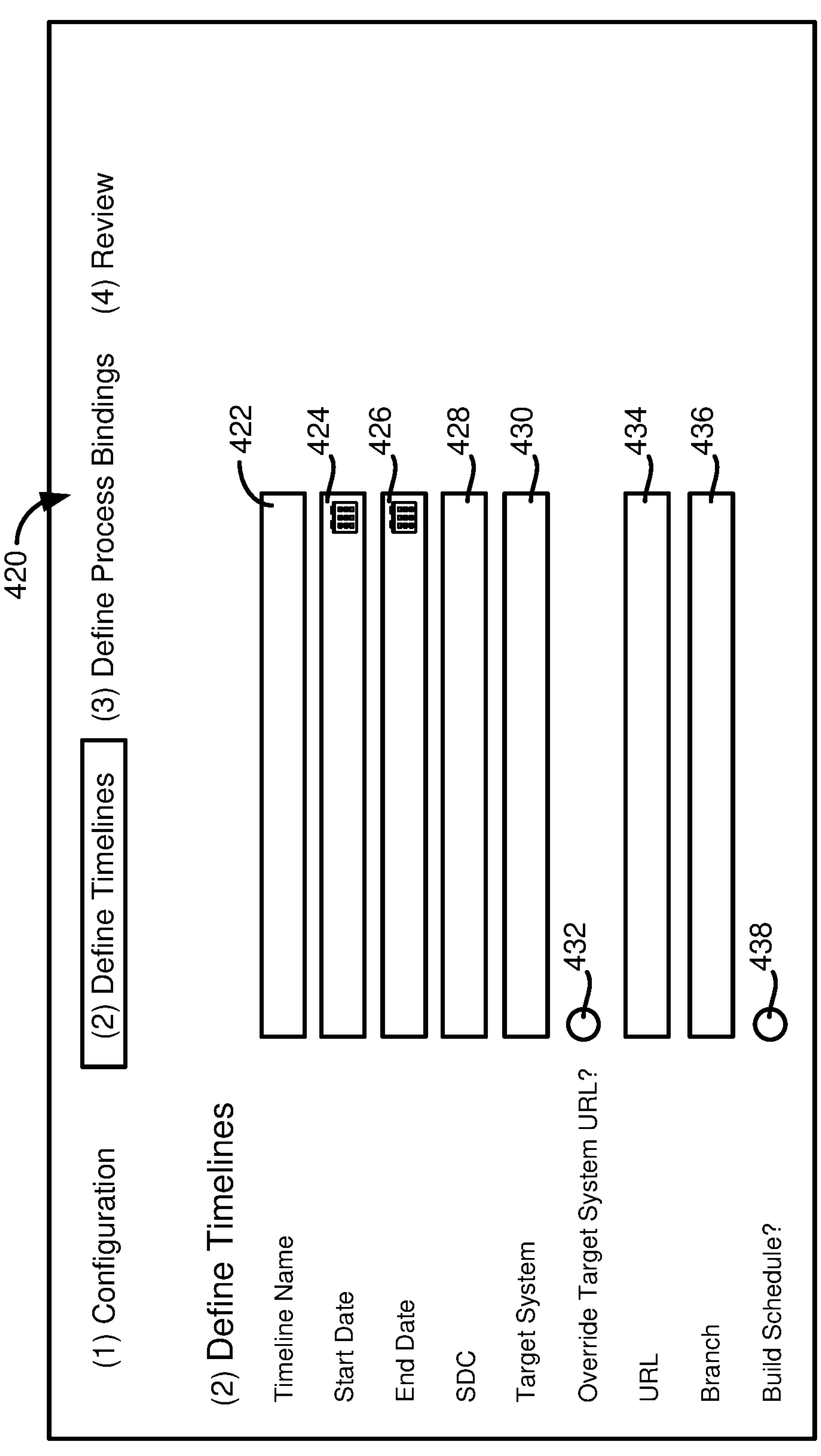

FIG. 4B illustrates a user interface 420 that allows a user to define configurations for one or more timelines included in a timeline scenario. A name for a timeline can be provided in a field 422. As described, a timeline can be associated with a particular time period, and so start and end dates can (in some cases optionally) be provided in fields 424 and 426.

Timelines are defined for execution on a specific target, such as a particular landscape. An SDC that includes configuration details for the target can be specified in a field 428, while the specific target can be identified in a field 430.

If it is desired to override a default URL for the target system, such as one specified in an SDC, the override can be configured using a radio button or similar control 432, and the URL to be used provided in a field 434. A branch, as described above, can be specified in a field 436. A radio button or similar control 438 can be used to specify whether a new software build should be created before the execution of tests associated with the timeline being defined.

Figure 4C:
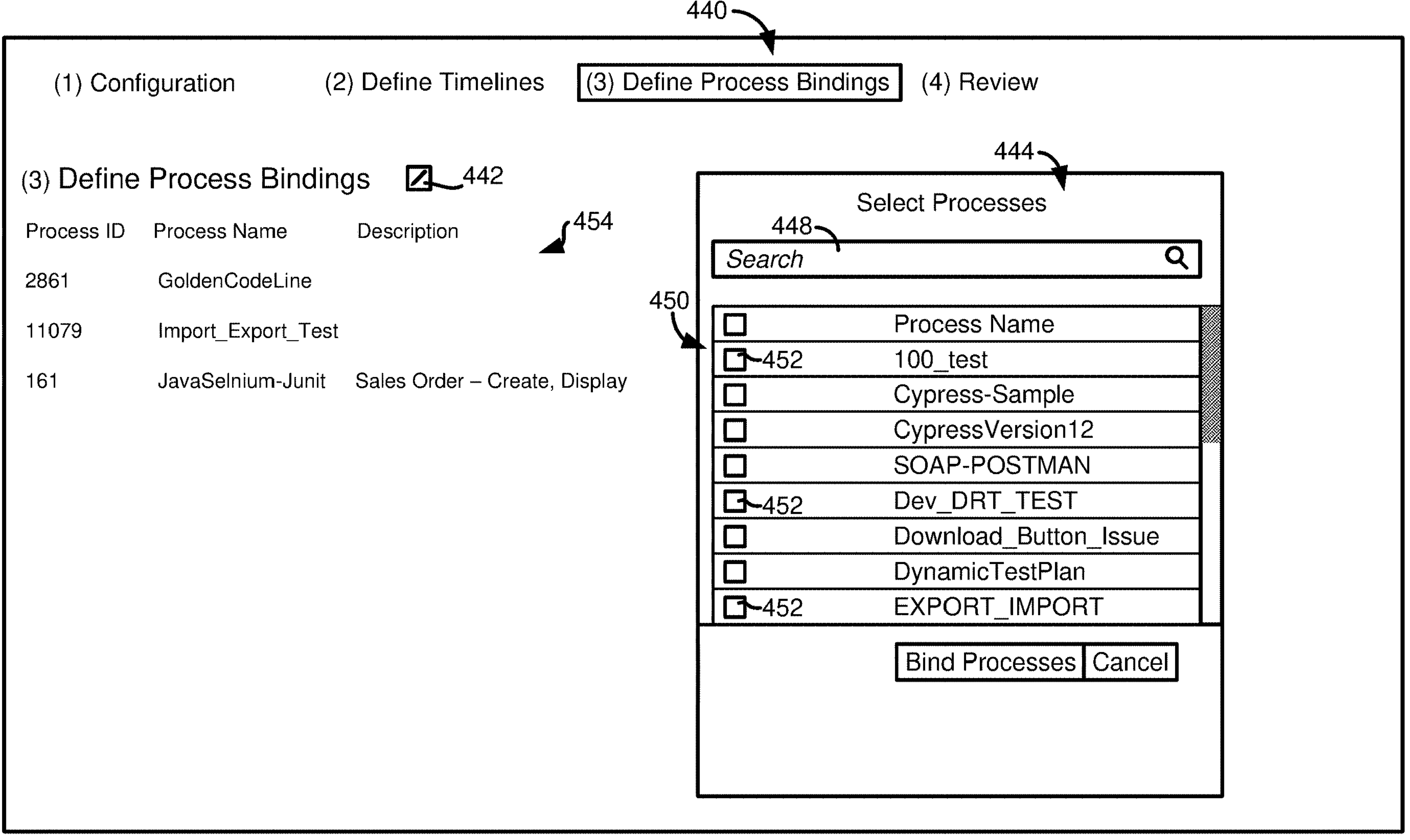

Once a timeline is defined, test processes can be assigned to the timeline using a user interface 440 shown in FIG. 4C. While assignment of test processes is shown and described, tests can be associated with timelines in another manner, such as having a timeline be directly associated with test cases, or with test packages or test plans. Further, in some cases, the increment provided through the user interface screen 420 of FIG. 4B can be used to retrieve tests associated with an identifier for that increment.

Task processes can be assigned to a timeline, or edited, by selecting a user interface control 442. When the user interface control 442 is selected, a window 444 can be displayed. The window 444 includes a search field 448, where a user can search for specific task processes, such as by name or other identifier. A list 450 of available task processes is displayed, and a user can select a particular task process to be included in the timeline by selecting a selection box 452.

After selection of process tasks, the user interface 440 can be updated to include a list 454 of task processes associated with the timeline.

Figure 4D:
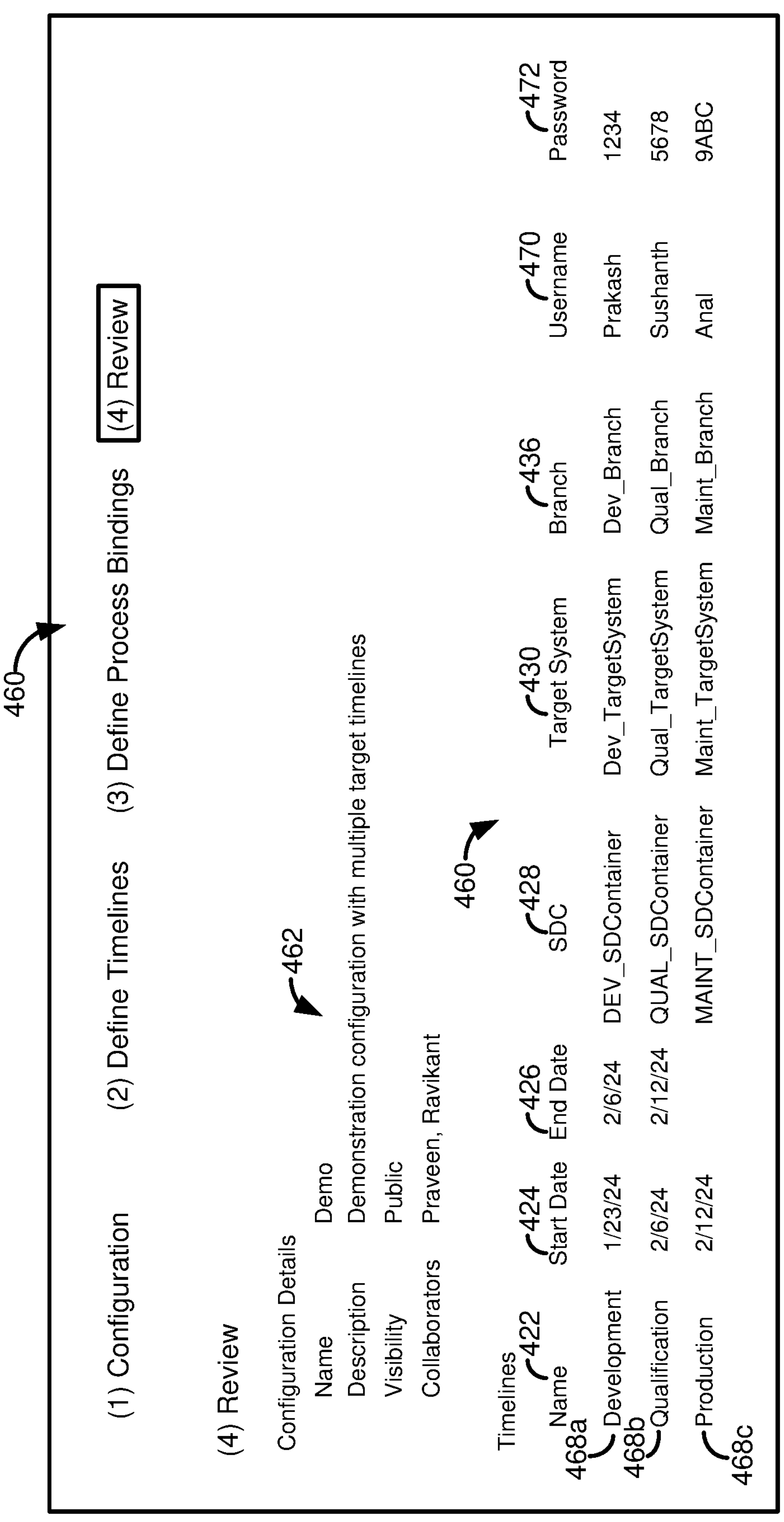

FIG. 4D provides a user interface screen 460 that provides summary information for a timeline scenario configured using the user interface screens 400, 420, 440 of FIGS. 4A-4C. The user interface screen 460 provides configuration details 462 for the timeline scenario, such as the name, description, visibility, and collaborators information entered through the user interface screen 400.

A tabular display 466 includes details for particular timelines associated with the timeline scenario, where the timelines are represented as rows 468*a*-468*c* of the tabular display 466. The tabular display 466 includes columns corresponding to the name 422, start date 424, end date 426, SDC 428, target system 430, and branch 436 defined using the user interface screen 420 of FIG. 4B.

The tabular display 466 also includes columns 470, 472 providing a username and password. The username 470 and password 472 can be credentials used when executing test at a target system. In some cases, the username 470 and password 472 can be defined in the SDC specified in column 428 for the target system specified in column 430.

Figure 5:
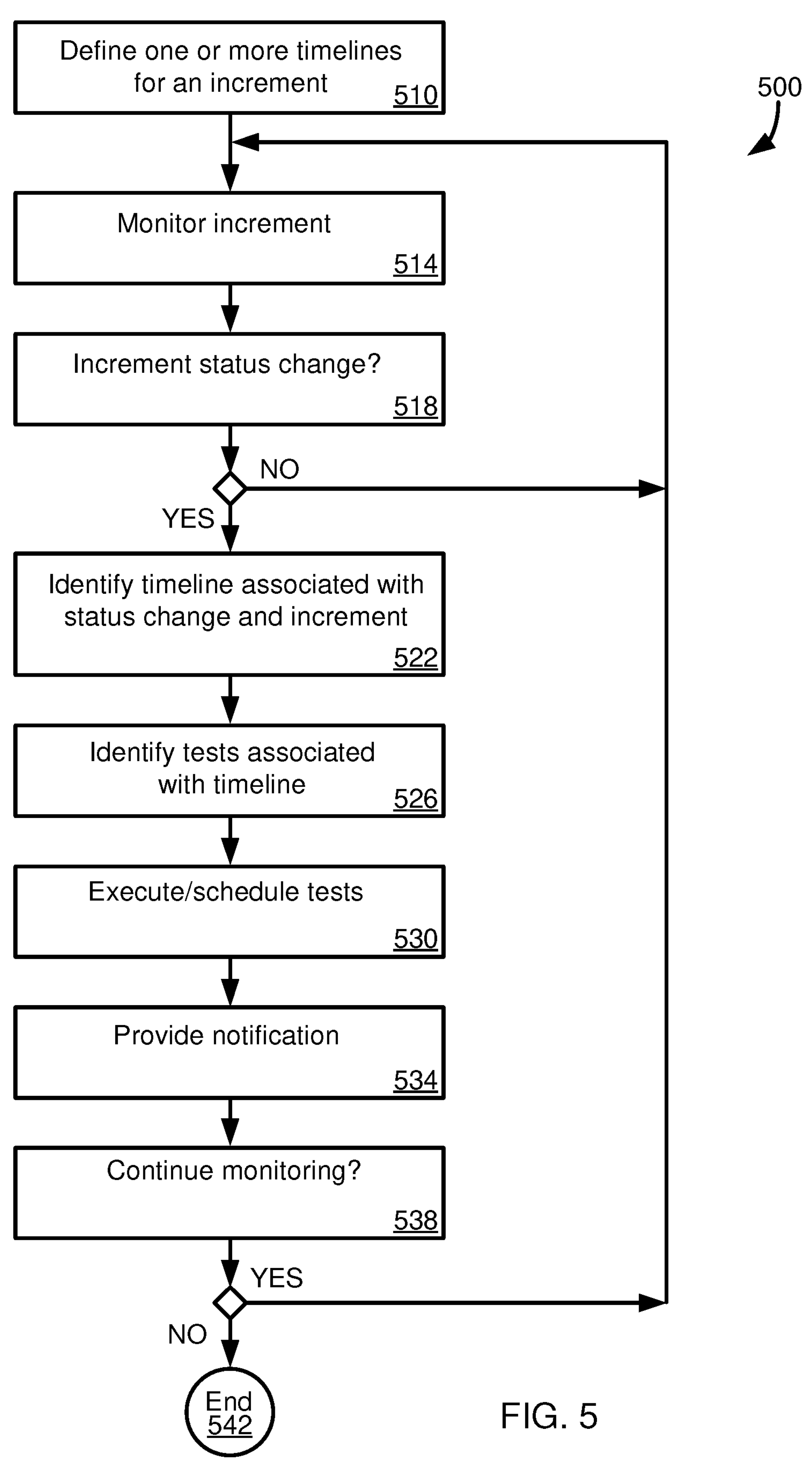
FIG. 5 is a flowchart of a process for monitoring a status of an increment to one or more software artifacts and triggering the execution of scheduling of software tests associated with the increment according to a timeline defined for the increment.

Example 5—Example Increment Monitoring and Triggering of Test Scheduling or Execution According to a Timeline Definition FIG. 5 is a flowchart of a process 500 for executing or scheduling tests based on status changes for increments. One or more timelines for an increment are defined at 510. Defining the one or more timelines can be carried out as described in Example 4. In particular, a timeline scenario can be defined that includes multiple timelines, such as for different targets that will be associated with testing of the increment, or for other status changes for the increment.

The increment is monitored at 514. That is, for example, the increment can be associated with a particular status, such as a particular target in which the increment is currently "active." Monitoring the status can include periodically checking the status information for the increment, such as in metadata associated with the increment. Monitoring the status can also include waiting for messages indicating a status change for the increment. For example, a system can be configured to generate a message to a monitoring component when increment status information changes.

It is determined at 518 whether a status change for an increment associated with a timeline has changed. If not, the process 500 can return to 514. If a status change is determined at 518 to have occurred, one or more timelines associated with the status change and the increment are identified at 522. For example, if the status change is from having the increment be active in a first target to having the increment being active in a second target, one or more timelines associated with the increment and the second target are identified.

One or more tests associated with the one or more timelines are identified at 526, and are executed or scheduled for execution at 530. In the scenario of Example 4, scheduling or executing tests can include scheduling or executing tests in one or more task processes associated with a given timeline. A notification that the tests have been executed or scheduled for execution can optionally be provided at 534, such as being provided to a user associated with the timeline. Providing a notification can provide affirmative confirmation to a user that tests have been executed or scheduled for execution.

At 538, it is determined whether the increment should continue to be monitored. For example, if timelines are arranged in a sequence, and a last timeline in a sequence is reached, monitoring of a particular timeline scenario for the increment can be terminated at 538. In another example, timelines in a timeline scenario can be associated with dates. If a current date is later than a latest end date for a timeline of the timeline scenario, monitoring of the increment for the timeline scenario can be terminated 542. If timelines in the timeline scenario are still active, the process 500 can return to 514.

Figure 6:
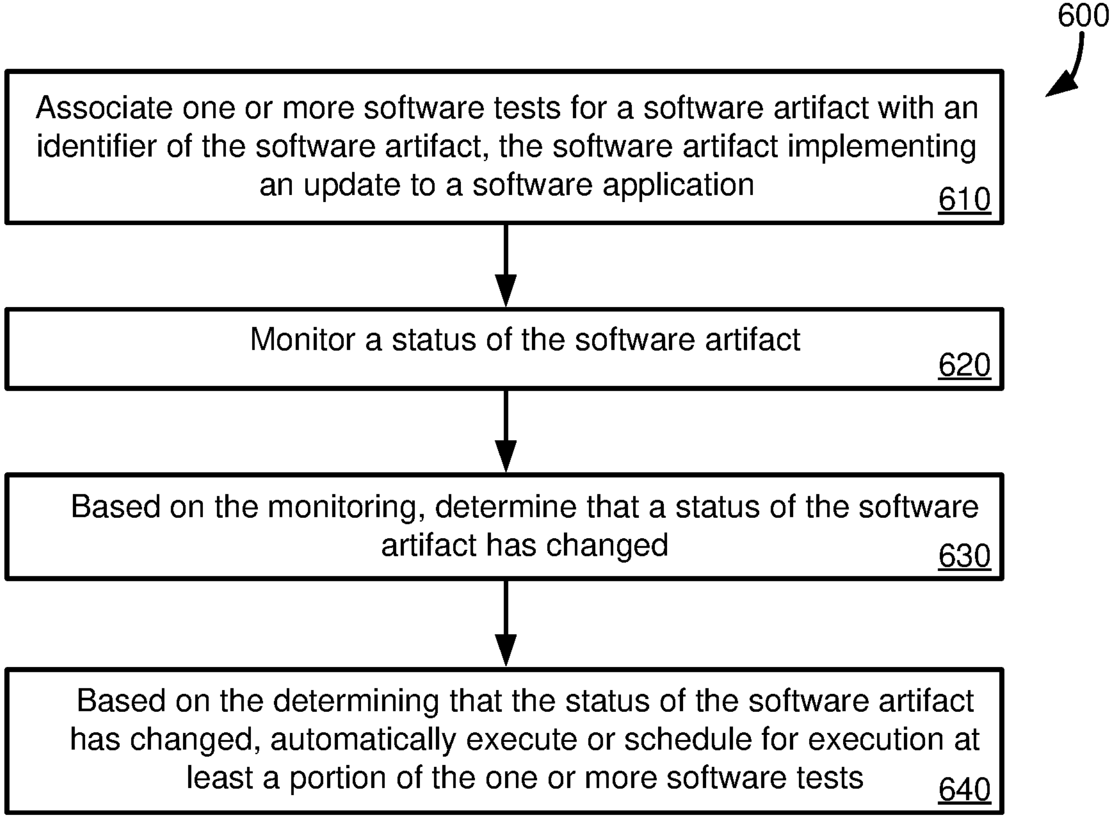
FIG. 6 is a flowchart of a process of automatically scheduling or executing software tests for a software artifact after a status change of the software artifact.

Example 6—Example Operations in Scheduling or Executing Software Tests Based on Status Change FIG. 6 is a flowchart of a process 600 of automatically scheduling or executing software tests for a software artifact after a status change of the software artifact. At 610, one or more software tests for a software artifact are associated with an identifier of the software artifact. The software artifact implements an update to a software application. A status of the software artifact is monitored at 620. At 630, based on the monitoring, it is determined that a status of the software artifact has changed. Based on the determining that the status of the software artifact has changed, at 640, at least a portion of the one or more software tests are automatically executed or scheduled for execution.

Example 7—Computing Systems

Figure 7:
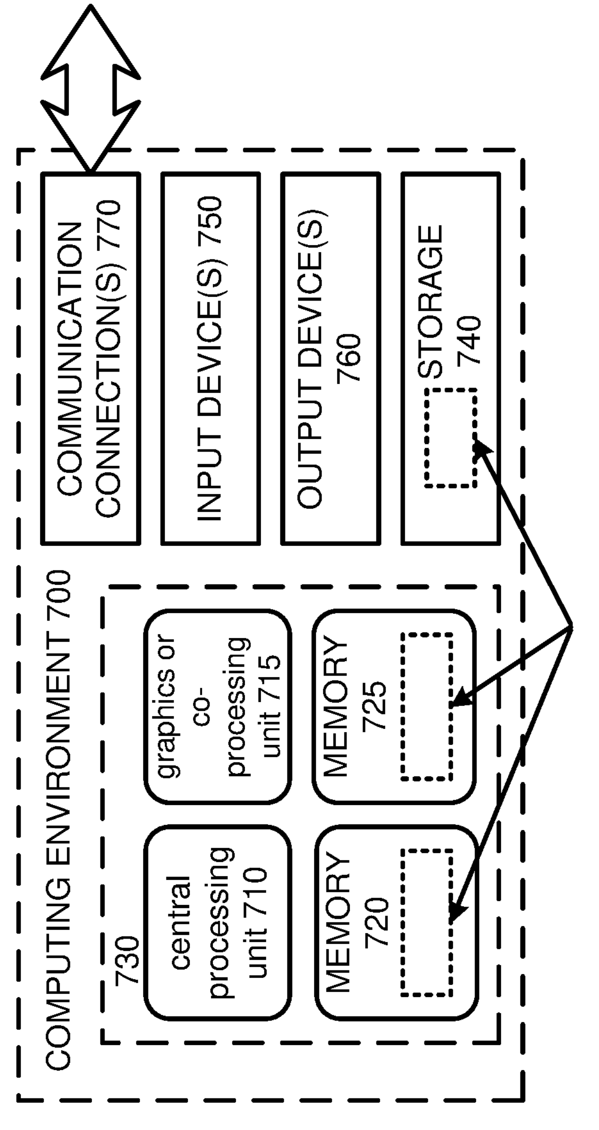
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality of the present disclosure, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing a database environment, and associated methods, described in Examples 1-6. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715.

A computing system 700 may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way, and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. The output device(s) 760 may be a display, printer, speaker, CD-writer, or another device that provides output from the computing system 700.

The communication connection(s) 770 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 8—Cloud Computing Environment

Figure 8:
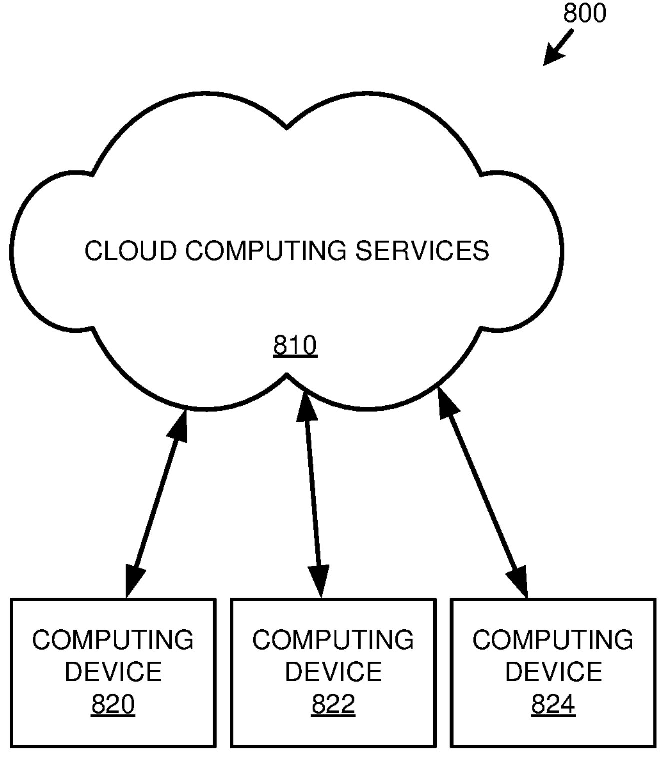
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operators (e.g., data processing, data storage, and the like).

Example 9—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:

at least one memory;

one or more hardware processor units coupled to the at least one memory; and one or more computer readable storage media storing computer-executable instructions that, when executed, cause the computing system to perform operations comprising:

associating one or more software tests for a software artifact with an identifier of the software artifact, the software artifact implementing an update to a software application;

defining a timeline scenario, the timeline scenario comprising a plurality of timelines, wherein a given timeline of the plurality of timelines comprises an identifier, an association with the identifier of the software artifact, and an association with at least one of the one or more software tests for the software artifact, given timelines of the plurality of timelines further being associated with a respective status change type, wherein at least a portion of the respective status change types differ between the plurality of timelines;

monitoring a status of the software artifact;

based on the monitoring, determining that the status of the software artifact has changed to provide a determined status change type; and automatically executing or scheduling for execution at least a portion of the one or more software tests associated with a timeline, of the plurality of timelines defined for the timeline scenario, associated with the determined status change type.

2. The computing system of claim 1, wherein at least a portion of the status change types represent a transition of the software artifact between different entities in a software deployment ecosystem.

3. The computing system of claim 2, wherein a first status change type of a first timeline of the plurality of timelines corresponds to the transition of the software artifact from a development landscape to a qualification landscape.

4. The computing system of claim 2, wherein a first status change type of a first timeline of the plurality of timelines corresponds to the transition of the software artifact from a qualification landscape to a maintenance landscape.

5. The computing system of claim 2, wherein given timelines of the plurality of timelines further comprise a system configuration profile for at least one entity in the software deployment ecosystem.

6. The computing system of claim 5, wherein the system configuration profile comprises configuration data for a plurality of entities in the software deployment ecosystem and at least one timeline of the plurality of timelines specifies a particular entity of the software deployment ecosystem having configuration data specified in the system configuration profile.

7. The computing system of claim 5, wherein the system configuration profile comprises a location identifier for the at least one entity in the software deployment ecosystem.

8. The computing system of claim 7, wherein the timeline specifies an alternative location identifier for the at least one entity, and the alternative location identifier is used in place of the location identifier in the system configuration profile when executing the one or more software tests.

9. The computing system of claim 2, the operations further comprising:

terminating or descheduling one or more tests in an entity of the software deployment ecosystem from which the software artifact transitioned.

10. The computing system of claim 2, wherein the entity from which the software artifact transitioned is specified in a first timeline of the plurality of timelines and an entity to which the increment transitioned is specified in a second timeline of the plurality of timelines.

11. The computing system of claim 1, wherein one or more of the plurality of timelines comprise at least one of a start date or an end date.

12. The computing system of claim 1, wherein the association with the at least one of the one or more software artifacts is specified as the identifier for the software artifact.

13. The computing system of claim 1, wherein the association with the at least one of the one or more software artifacts is specified as an identifier that identifies the at least one test.

14. The computing system of claim 13, wherein the identifier that identifies the at least one test identifies a group of tests, the group of tests comprising the at least one test.

15. The computing system of claim 1, wherein at least a portion of the status change types represent a transition of the software artifact between different deployment milestones.

16. The computing system of claim 15, wherein the deployment milestones are associated with different entities in a software deployment ecosystem.

17. The computing system of claim 1, the operations further comprising:

rendering for display a notification that the at least a portion of the one or more software tests have been executed or have been scheduled for execution.

18. A method, implemented in a computing system comprising at least one hardware processor and at least one memory coupled to the at least one hardware processor, the method comprising:

associating one or more software tests for a software artifact with an identifier of the software artifact, the software artifact implementing an update to a software application;

defining a timeline scenario, the timeline scenario comprising a plurality of timelines, wherein a given timeline of the plurality of timelines comprises an identifier, an association with the identifier of the software artifact, and an association with at least one of the one or more software tests for the software artifact, given timelines of the plurality of timelines further being associated with a respective status change type, wherein at least a portion of the respective status change types differ between the plurality of timelines;

monitoring a status of the software artifact;

based on the monitoring, determining that the status of the software artifact has changed to provide a determined status change type; and automatically executing or scheduling for execution at least a portion of the one or more software tests associated with a timeline, of the plurality of timelines defined for the timeline scenario, associated with the determined status change type.

19. The method of claim 18, wherein:

(i) at least a portion of the status change types represent a transition of the software artifact between different entities in a software deployment ecosystem;

(ii) given timelines of the plurality of timelines further comprise a system configuration profile for at least one entity in the software deployment ecosystem; and (iii) the system configuration profile comprises configuration data for a plurality of entities in the software deployment ecosystem and at least one timeline of the plurality of timelines specifies a particular entity of the software deployment ecosystem having configuration data specified in the system configuration profile.

20. One or more computer-readable storage media comprising:

computer-executable instructions that, when executed by a computing system comprising at least one hardware processor and at least one memory coupled to the at least one hardware processor, cause the computing system to associate one or more software tests for a software artifact with an identifier of the software artifact, the software artifact implementing an update to a software application;

computer-executable instructions that, when executed by the computing system, cause the computing system to define a timeline scenario, the timeline scenario comprising a plurality of timelines, wherein a given timeline of the plurality of timelines comprises an identifier, an association with the identifier of the software artifact, and an association with at least one of the one or more software tests for the software artifact, given timelines of the plurality of timelines further being associated with a respective status change type, wherein at least a portion of the respective status change types differ between the plurality of timelines;

computer-executable instructions that, when executed by the computing system, cause the computing system to monitor a status of the software artifact;

computer-executable instructions that, when executed by the computing system, cause the computing system to, based on the monitoring, determine that the status of the software artifact has changed; and computer-executable instructions that, when executed by the computing system, cause the computing system to automatically execute or schedule for execution at least a portion of the one or more software tests associated with a timeline, of the plurality of timelines defined for the timeline scenario, associated with the determined status change type.

* * * * *